United States Patent
Sonoda et al.

(10) Patent No.: US 6,911,281 B2
(45) Date of Patent: Jun. 28, 2005

(54) NON-AQUEOUS ELECTROLYTE AND ELECTROCHEMICAL DEVICE COMPRISING THE SAME

(75) Inventors: Kumiko Sonoda, Hirakata (JP); Atsushi Ueda, Osaka (JP); Kazuya Iwamoto, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 231 days.

(21) Appl. No.: 09/901,945

(22) Filed: Jul. 10, 2001

(65) Prior Publication Data

US 2002/0028389 A1 Mar. 7, 2002

(30) Foreign Application Priority Data

Jul. 17, 2000 (JP) ........................................ 2000-215521
Sep. 26, 2000 (JP) ........................................ 2000-291715

(51) Int. Cl.$^7$ ...................... H01M 10/40; H01G 9/035; H01G 9/038
(52) U.S. Cl. ...................... 429/199; 429/201; 361/502; 361/505; 252/62.2
(58) Field of Search ........................ 252/62.2; 429/321, 429/322, 323, 199, 200, 201; 361/502, 505

(56) References Cited

U.S. PATENT DOCUMENTS

| | | | | |
|---|---|---|---|---|
| 6,383,688 B1 | * | 5/2002 | Inagaki et al. | 429/322 |
| 6,495,293 B1 | * | 12/2002 | Arai et al. | 429/307 |
| 6,573,004 B1 | * | 6/2003 | Igarashi et al. | 429/217 |
| 2001/0033964 A1 | * | 10/2001 | Heider et al. | 429/188 |
| 2002/0007027 A1 | * | 1/2002 | Wang et al. | 526/217 |
| 2002/0015884 A1 | * | 2/2002 | Schmidt et al. | 429/188 |
| 2003/0171621 A1 | * | 9/2003 | Van Boom et al. | 564/503 |

FOREIGN PATENT DOCUMENTS

| | | |
|---|---|---|
| JP | 2000-195554 | 7/2000 |
| WO | WO 98/15562 A1 | 4/1998 |
| WO | WO 99/25039 * | 5/1999 |
| WO | WO 99/34471 * | 7/1999 |

OTHER PUBLICATIONS

Brauer et al., "Electrochemical and Ozone Oxidation of $(CF_3)_3B \cdot NH_3$: Formation and Characterization of Products with Nondegradated $(CF_3)_3B$ Groups", *Eur. J. Inorg. Chem.* pp. 247–253 (1999).

* cited by examiner

Primary Examiner—Jonathan Crepeau
(74) Attorney, Agent, or Firm—Akin Gump Strauss Hauer & Feld, LLP (57) ABSTRACT

A non-aqueous electrolyte is disclosed, which comprises a non-aqueous solvent and a solute represented by the general formula(1): $MBR^1R^2R^3R^4$, wherein M is an alkali metal atom or an ammonium group and $R^1$ to $R^4$ are each independently electron withdrawing groups or electron withdrawing atoms bound to B where at least one of $R^1$ to $R^4$ is other than a fluorine atom. The solute has a thermal stability substantially equal to that of $LiBF_4$ and an anion portion having a high electronegativity, and easily dissociates into ions. Therefore, a non-aqueous electrolyte containing this solute has a high ionic conductivity and is difficult to cause a generation of a gas or deterioration in characteristics due to the decomposition of the solute, which occurs during use at high temperatures or after storage at high temperatures.

9 Claims, 2 Drawing Sheets

NON-AQUEOUS ELECTROLYTE AND ELECTROCHEMICAL DEVICE COMPRISING THE SAME

BACKGROUND OF THE INVENTION

Electrochemical devices comprising a non-aqueous electrolyte have been used in a wide range of electric and electronic appliances. Such electrochemical devices include, for example, non-aqueous electrolyte batteries such as a lithium battery, and capacitors such as an electric double layer capacitor and an electrolytic capacitor.

It is desirable that a non-aqueous electrolyte comprising a non-aqueous solvent and a solute has a high ionic conductivity. In order to obtain such a non-aqueous electrolyte, a non-aqueous solvent having a high dielectric constant and a low viscosity is required. However, a non-aqueous solvent having a high dielectric constant usually has a strong polarity and therefore has a high viscosity. Thus, a mixed non-aqueous electrolyte containing a non-aqueous solvent with a high dielectric constant such as ethylene carbonate (dielectric constant: 90) and a non-aqueous solvent with a low dielectric constant such as dimethyl carbonate (dielectric constant: 3.1) or ethyl methyl carbonate (dielectric constant: 2.9) is commonly used.

As the solute constituting the non-aqueous electrolyte, for example, $LiPF_6$, $LiClO_4$, $LiBF_4$, $LiAlCl_4$, $LiSbF_6$, $LiSCN$, $LiCl$, $LiAsF_6$, $LiCF_3SO_3$, $(CF_3SO_2)_2NLi$ or the like is used. Among them, $LiPF_6$ is most frequently used because it has a wide potential window and thus provides a non-aqueous electrolyte having a high ionic conductivity.

While a non-aqueous electrolyte containing $LiPF_6$ has a high ionic conductivity of approximately 8.5 mS/cm at room temperature, it has a low thermal stability. Moreover, $LiPF_6$ is problematic in that it reacts sharply with moisture to decompose. HF, $PF_5$ or the like produced by the decomposition of $LiPF_6$ has an adverse effect on an electrochemical device. Accordingly, when an electrochemical device, which comprises a non-aqueous electrolyte containing $LiPF_6$, is used for an appliance generating a great amount of heat, the performance of the electrochemical device may deteriorate or a gas may be generated inside the device.

Although the uses of $LiSO_3CF_3$, $(CF_3SO_2)_2NLi$ and the like have also been investigated, they are not proceeding towards practical utilization. This is because many of solutes containing an organic anion tend to cause a corrosion of a current collector made of aluminum, which is used in the positive electrode of a non-aqueous electrolyte battery.

On the other hand, $LiBF_4$, which is commonly used in lithium primary batteries, has a higher thermal stability as compared with $LiPF_6$ and a potential window substantially equal to that of $LiPF_6$. However, a non-aqueous electrolyte obtained by dissolving $LiBF_4$ in a non-aqueous solvent has a low ionic conductivity of about 2.9 mS/cm at room temperature. For this reason, $LiBF_4$ is not used in lithium secondary batteries.

The reason why $LiBF_4$ has a lower ionic conductivity as compared with $LiPF_6$ is that only four fluorine atoms having an electron withdrawing property are bound to one boron atom in $LiBF_4$, whereas six fluorine atoms are bound to one phosphorus atom in $LiPF_6$. Since electronegativity depends on the number of the bound fluorine atoms, the electronegativity of the $BF_4$ anion is lower than that of the $PF_6$ anion. Therefore, it is considered that $LiBF_4$ is difficult to dissociate into a Li cation and a $BF_4$ anion. Moreover, because the $BF_4$ anion has a small ionic diameter, it tends to cause an association thereby to deteriorate the ionic conductivity of the electrolyte.

The dielectric loss in an electrolytic capacitor is greatly affected by the ionic conductivity of the non-aqueous electrolyte interposed between a negative electrode foil and a dielectric layer which comprises an oxide of aluminum or tantalum disposed on a positive electrode foil. When the dielectric loss is great, the frequency characteristics and the charge/discharge characteristics of the electrolytic capacitor are deteriorated. Nevertheless, a non-aqueous electrolyte accommodated in an electrolytic capacitor contains a solute which dissociates to produce a $BF_4$ anion, resulting in a great dielectric loss in the capacitor.

BRIEF SUMMARY OF THE INVENTION

In view of the above situation, it is an object of the present invention to provide a non-aqueous electrolyte having a high thermal stability as well as a high ionic conductivity.

More specifically, the present invention relates to a non-aqueous electrolyte comprising a non-aqueous solvent and a solute represented by the general formula (1): $MBR^1R^2R^3R^4$, wherein M is an alkali metal atom or an ammonium group and $R^1$ to $R^4$ are each independently electron withdrawing groups or electron withdrawing atoms bound to B where at least one of $R^1$ to $R^4$ is other than a fluorine atom.

In the general formula (1), it is preferred that at least one of $R^1$ to $R^4$ is represented by the general formula (2): $C_nF_{2n+1}$, where n is an integer of 1 to 4; or the general formula (3): $C_mF_{2m+1}SO_2$, where m is an integer of 1 to 4. Further, the remainder of $R^1$ to $R^4$ are preferably fluorine atoms.

For the solute represented by the general formula (1), it is preferred to use at least one selected from the group consisting of $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(CF_3SO_2)_4$, $LiBF(CF_3SO_2)_3$, $LiBF_2(CF_3SO_2)_2$, $LiBF_3(CF_3SO_2)$, $LiB(C_2F_5SO_2)_4$, $LiBF(C_2F_5SO_2)_3$, $LiBF_2(C_2F_5SO_2)_2$ and $LiBF_3(C_2F_5SO_2)$.

In the case where M is an ammonium group in the general formula (1), it is preferred that the ammonium group is represented by the general formula (4): $NR^5R^6R^7R^8$, where $R^5$ to $R^8$ are bound to N and are each independently hydrogen atoms, alkyl groups, alkenyl groups or aryl groups. In this case, the above solute is preferably at least one selected from the group consisting of $(CH_3)_4NB(CF_3)_4$, $(CH_3)_4NBF(CF_3)_3$, $(CH_3)_4NBF_2(CF_3)_2$, $(CH_3)_4NBF_3(CF_3)$, $(CH_3)_4NB(C_2F_5)_4$, $(CH_3)_4NBF(C_2F_5)_3$, $(CH_3)_4NBF_2(C_2F_5)_2$, $(CH_3)_4NBF_3(C_2F_5)$, $(C_2H_5)_4NB(CF_3)_4$, $(C_2H_5)_4NBF(CF_3)_3$, $(C_2H_5)_4NBF_2(CF_3)_2$, $(C_2H_5)_4NBF_3(CF_3)$, $(C_2H_5)_4NB(C_2F_5)_4$, $(C_2H_5)_4NBF(C_2F_5)_3$, $(C_2H_5)_4NBF_2(C_2F_5)_2$, $(C_2H_5)_4NBF_3(C_2F_5)$, $((CH_3)_3C)_4NB(CF_3)_4$, $((CH_3)_3C)_4NBF(CF_3)_3$, $((CH_3)_3C)_4NBF_2(CF_3)_2$, $((CH_3)_3C)_4NBF_3(CF_3)$, $((CH_3)_3C)_4NB(C_2F_5)_4$, $((CH_3)_3C)_4NBF(C_2F_5)_3$, $((CH_3)_3C)_4NBF_2(C_2F_5)_2$, $((CH_3)_3C)_4NBF_3(C_2F_5)$, $(CH_3)_4NB(CF_3SO_2)_4$, $(CH_3)_4NBF(CF_3SO_2)_3$, $(CH_3)_4NBF_2(CF_3SO_2)_2$, $(CH_3)_4NBF_3(CF_3SO_2)$, $(CH_3)_4NB(C_2F_5SO_2)_4$, $(CH_3)_4NBF(C_2F_5SO_2)_3$, $(CH_3)_4NBF_2(C_2F_5SO_2)_2$, $(CH_3)_4NBF_3(C_2F_5SO_2)$, $(C_2H_5)_4NB(CF_3SO_2)_4$, $(C_2H_5)_4NBF(CF_3SO_2)_3$, $(C_2H_5)_4NBF_2(CF_3SO_2)_2$, $(C_2H_5)_4NBF_3(CF_3SO_2)$, $(C_2H_5)_4NB(C_2F_5SO_2)_4$, $(C_2H_5)_4NBF(C_2F_5SO_2)_3$, $(C_2H_5)_4NBF_2(C_2F_5SO_2)_2$, $(C_2H_5)_4NBF_3(C_2F_5SO_2)$, $((CH_3)_3C)_4NB(CF_3SO_2)_4$, $((CH_3)_3C)_4NBF(CF_3SO_2)_3$, $((CH_3)_3C)_4NBF_2(CF_3SO_2)_2$, $((CH_3)_3C)_4NBF_3(CF_3SO_2)$, $((CH_3)_3C)_4NB(C_2F_5SO_2)_4$, $((CH_3)_3C)_4NBF(C_2F_5SO_2)_3$, $((CH_3)_3C)_4NBF_2(C_2F_5SO_2)_2$ and $((CH_3)_3C)_4NBF_3(C_2F_5SO_2)$.

The present invention further relates to an electrochemical device comprising the above non-aqueous electrolyte.

Examples of the electrochemical device include a non-aqueous electrolyte battery, an electric double layer capacitor, an electrolytic capacitor and the like.

The non-aqueous electrolyte battery preferably comprises a positive electrode; a negative electrode; a separator interposed between the positive electrode and the negative electrode; and a non-aqueous electrolyte containing at least one selected from the group consisting of $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(CF_3SO_2)_4$, $LiBF(CF_3SO_2)_3$, $LiBF_2(CF_3SO_2)_2$, $LiBF_3(CF_3SO_2)$, $LiB(C_2F_5SO_2)_4$, $LiBF(C_2F_5SO_2)_3$, $LiBF_2(C_2F_5SO_2)_2$ and $LiBF_3(C_2F_5SO_2)$.

The electric double layer capacitor preferably comprises a pair of polarizable electrodes made of activated carbon; a separator interposed between the electrodes; and a non-aqueous electrolyte containing at least one selected from the group consisting of $(CH_3)_4NB(CF_3)_4$, $(CH_3)_4NBF(CF_3)_3$, $(CH_3)_4NBF_2(CF_3)_2$, $(CH_3)_4NBF_3(CF_3)$, $(CH_3)_4NB(C_2F_5)_4$, $(CH_3)NBF(C_2F_5)_3$, $(CH_3)_4NBF_2(C_2F_5)_2$, $(CH_3)_4NBF_3(C_2F_5)$, $(C_2H_5)_4NB(CF_3)_4$, $(C_2H_5)_4NBF(CF_3)_3$, $(C_2H_5)_4NBF_2(CF_3)_2$, $(C_2H_5)_4NBF_3(CF_3)$, $(C_2H_5)_4NB(C_2F_5)_4$, $(C_2H_5)_4NBF(C_2F_5)_3$, $(C_2H_5)_4NBF_2(C_2F_5)_2$, $(C_2H_5)_4NBF_3(C_2F_5)$, $((CH_3)_3C)_4NB(CF_3)_4$, $((CH_3)_3C)_4NBF(CF_3)_3$, $((CH_3)_3C)_4NBF_2(CF_3)_2$, $(CH_3)_3C)_4NBF_3(CF_3)$, $((CH_3)_3C)_4NB(C_2F_5)_4$, $((CH_3)_3C)_4NBF(C_2F_5)_3$, $((CH_3)_3C)_4NBF_2(C_2F_5)_2$, $((CH_3)_3C)_4NBF_3(C_2F_5)$, $(CH_3)_4NB(CF_3SO_2)_4$, $(CH_3)_4NBF(CF_3SO_2)_3$, $(CH_3)_4NBF_2(CF_3SO_2)_2$, $(CH_3)_4NBF_3(CF_3SO_2)$, $(CH_3)_4NB(C_2F_5SO_2)_4$, $(CH_3)_4NBF(C_2F_5SO_2)_3$, $(CH_3)_4NBF_2(C_2F_5SO_2)_2$, $(CH_3)_4NBF_3(C_2F_5SO_2)$, $(C_2H_5)_4NB(CF_3SO_2)_4$, $(C_2H_5)_4NBF(CF_3SO_2)_3$, $(C_2H_5)_4NBF_2(CF_3SO_2)_2$, $(C_2H_5)_4NBF_3(CF_3SO_2)$, $(C_2H_5)_4NB(C_2F_5SO_2)_4$, $(C_2H_5)_4NBF(C_2F_5SO_2)_3$, $(C_2H_5)_4NBF_2(C_2F_5SO_2)_2$, $(C_2H_5)_4NBF_3(C_2F_5SO_2)$, $((CH_3)_3C)_4NB(CF_3SO_2)_4$, $((CH_3)_3C)_4NBF(CF_3SO_2)_3$, $((CH_3)_3C)_4NBF_2(CF_3SO_2)_2$, $((CH_3)_3C)_4NBF_3(CF_3SO_2)$, $((CH_3)_3C)_4NB(C_2F_5SO_2)_4$, $((CH_3)_3C)_4NBF(C_2F_5SO_2)_3$, $((CH_3)_3C)_4NBF_2(C_2F_5SO_2)_2$ and $((CH_3)_3C)_4NBF_3(C_2F_5SO_2)$.

The electrolytic capacitor preferably comprises a positive electrode foil having a dielectric layer; a negative electrode foil; a separator interposed between the positive electrode foil and the negative electrode foil; and a non-aqueous electrolyte containing at least one selected from the group consisting of $(CH_3)_4NB(CF_3)_4$, $(CH_3)_4NBF(CF_3)_3$, $(CH_3)_4NBF_2(CF_3)_2$, $(CH_3)_4NBF_3(CF_3)$, $(CH_3)_4NB(C_2F_5)_4$, $(CH_3)_4NBF(C_2F_5)_3$, $(CH_3)_4NBF_2(C_2F_5)_2$, $(CH_3)_4NBF_3(C_2F_5)$, $(C_2H_5)_4NB(CF_3)_4$, $(C_2H_5)_4NBF(CF_3)_3$, $(C_2H_5)_4NBF_2(CF_3)_2$, $(C_2H_5)_4NBF_3(CF_3)$, $(C_2H_5)_4NB(C_2F_5)_4$, $(C_2H_5)_4NBF(C_2F_5)_3$, $(C_2H_5)_4NBF_2(C_2F_5)_2$, $(C_2H_5)_4NBF_3(C_2F_5)$, $((CH_3)_3C)_4NB(CF_3)_4$, $((CH_3)_3C)_4NBF(CF_3)_3$, $((CH_3)_3C)_4NBF_2(CF_3)_2$, $(CH_3)_3C)_4NBF_3(CF_3)$, $((CH_3)_3C)_4NB(C_2F_5)_4$, $((CH_3)_3C)_4NBF(C_2F_5)_3$, $((CH_3)_3C)_4NBF_2(C_2F_5)_2$, $((CH_3)_3C)_4NBF_3(C_2F_5)$, $(CH_3)_4NB(CF_3SO_2)_4$, $(CH_3)_4NBF(CF_3SO_2)_3$, $(CH_3)_4NBF_2(CF_3SO_2)_2$, $(CH_3)_4NBF_3(CF_3SO_2)$, $(CH_3)_4NB(C_2F_5SO_2)_4$, $(CH_3)_4NBF(C_2F_5SO_2)_3$, $(CH_3)_4NBF_2(C_2F_5SO_2)_2$, $(CH_3)_4NBF_3(C_2F_5SO_2)$, $(C_2H_5)_4NB(CF_3SO_2)_4$, $(C_2H_5)_4NBF(CF_3SO_2)_3$, $(C_2H_5)_4NBF_2(CF_3SO_2)_2$, $(C_2H_5)_4NBF_3(CF_3SO_2)$, $(C_2H_5)_4NB(C_2F_5SO_2)_4$, $(C_2H_5)_4NBF(C_2F_5SO_2)_3$, $(C_2H_5)_4NBF_2(C_2F_5SO_2)_2$, $(C_2H_5)_4NBF_3(C_2F_5SO_2)$, $((CH_3)_3C)_4NB(CF_3SO_2)_4$, $((CH_3)_3C)_4NBF(CF_3SO_2)_3$, $((CH_3)_3C)_4NBF_2(CF_3SO_2)_2$, $((CH_3)_3C)_4NBF_3(CF_3SO_2)$, $((CH_3)_3C)_4NB(C_2F_5SO_2)_4$, $((CH_3)_3C)_4NBF(C_2F_5SO_2)_3$, $((CH_3)_3C)_4NBF_2(C_2F_5SO_2)_2$ and $((CH_3)_3C)_4NBF_3(C_2F_5SO_2)$.

Generally, a solute is composed of an anion and a cation, and they form an ionic bond. Therefore, the general formula (1): $MBR^1R^2R^3R^4$ may also be expressed as the general formula (1'): $M^+ \cdot (BR^1R^2R^3R^4)^-$.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention uses a solute which has a thermal stability substantially equal to that of $LiBF_4$ and has an anion portion having a high electronegativity, and easily dissociates into ions in a non-aqueous solvent. Examples of the solute include ones having one or more perfluoroalkyl group represented by the general formula: $C_nF_{2n+1}$ or perfluoroalkylsulfonic acid group represented by the general formula: $C_mF_{2m+1}SO_2$ bound to the boron atom. Since a perfluoroalkyl group and a perfluoroalkylsulfonic acid group have a strong electron withdrawing property, a solute having either of these groups easily dissociates into ions in a non-aqueous solvent. Accordingly, the use of the above solutes can provide a non-aqueous electrolyte having a high thermal stability as well as a high ionic conductivity and, furthermore, it can provide a non-aqueous electrochemical device capable of conducting an efficient high-rate charging and discharging.

It is considered that the more the number of the electron withdrawing groups bound to a boron atom of a solute is, the greater the electronegativity of the anion portion of the solute and the tendency thereof to dissociate into ions become. It is also considered that the more the number of the electron withdrawing groups bound to a boron atom of a solute is, the greater the anionic diameter of the solute becomes and the smaller the tendency thereof to cause an association becomes.

Embodiment 1

In this embodiment, descriptions will be made on a preferred non-aqueous electrolyte for use in a lithium primary battery, a lithium secondary battery, a lithium ion battery, a polymer battery and the like. A non-aqueous electrolyte of this embodiment can be obtained by dissolving the following solute in the following non-aqueous solvent.

(i) Solute

A non-aqueous electrolyte of this embodiment contains a solute represented by the general formula: $M'BR^1R^2R^3R^4$, wherein M' is an alkali metal atom such as Li, Na or K and $R^1$ to $R^4$ are electron withdrawing groups or electron withdrawing atoms bound to a boron atom where at least one of $R^1$ to $R^4$ is other than a fluorine atom.

It is preferred that at least one of $R^1$ to $R^4$ is a group represented by the general formula: $C_nF_{2n+1}$, where n is an integer of 1 to 4, or a group represented by the general formula: $C_mF_{2m+1}SO_2$, where m is an integer of 1 to 4. The remainders are preferably fluorine atoms.

Since an anion having a group represented by the general formula: $C_nF_{2n+1}$ is smaller than an anion having a group represented by the general formula: $C_mF_{2m+1}SO_2$, a non-aqueous electrolyte containing the former anion has a higher ionic conductivity than the latter one. Therefore, the group represented by the general formula: $C_nF_{2n+1}$, where n is an integer of 1 to 4 is more preferred than the group represented by the general formula: $C_mF_{2m+1}SO_2$, where m is a integer of 1 to 4.

The number of the electron withdrawing group other than a fluorine atom may be one or more; however, it is more preferably 2 to 3 from the viewpoint of, for example, ease of the synthesis of the solute. Preferred examples of the solute include solutes represented by the general formula: M'B$(C_nF_{2n+1})_2F_2$ or solutes represented by the general formula: M'B$(C_nF_{2n+1})_3F$.

Although n and m may be an integer of 1 to 4, it is more preferred that they are 2. The reason is that the electron withdrawing effect of the electron withdrawing group decreases when n and m are too small, and the anionic diameter increases when n and m are too large.

Specific examples of the solute include LiB$(CF_3)_4$, LiBF$(CF_3)_3$, LiBF$_2(CF_3)_2$, LiBF$_3(CF_3)$, LiB$(C_2F_5)_4$, LiBF$(C_2F_5)_3$, LiBF$_2(C_2F_5)_2$, LiBF$_3(C_2F_5)$, LiB$(CF_3SO_2)_4$, LiBF$(CF_3SO_2)_3$, LiBF$_2(CF_3SO_2)_2$, LiBF$_3(CF_3SO_2)$, LiB$(C_2F_5SO_2)_4$, LiBF$(C_2F_5SO_2)_3$, LiBF$_2$ $(C_2F_5SO_2)_2$, LiBF$_3$ $(C_2F_5SO_2)$ and the like. They may be used singly or as a mixture of two or more of them.

The non-aqueous electrolyte may further contain LiClO$_4$, LiBF$_4$, LiPF$_6$, LiAlCl$_4$, LiSbF$_6$, LiSCN, LiCF$_3$SO$_3$, LiCF$_3$CO$_2$, Li(CF$_3$SO$_2$)$_2$, LiAsF$_6$, LiB$_{10}$Cl$_{10}$, a lithium lower aliphatic carboxylate, LiCl, LiBr, LiI, chloroboran lithium, borates such as bis(1,2-benzenediolate(2-)-O,O') lithium borate, bis(2,3-naphthalenediolate(2-)-O,O') lithium borate, bis(2,2'-biphenyldiolate(2-)-O,O') lithium borate and bis(5-fluoro-2-olate-1-benzenesulfonic acid-O,O') lithium borate, imide salts such as bistetrafluoromethanesulfonic acid imide lithium ((CF$_3$SO$_2$)$_2$NLi), tetrafluoromethane-sulfonic acid nonafluorobutanesulfonic acid imide lithium (LiN(CF$_3$SO$_2$)(C$_4$F$_9$SO$_2$)) and bispentafluoroethanesulfonic acid imide lithium ((C$_2$F$_5$SO$_2$)$_2$NLi).

(ii) Non-aqueous Solvent

Examples of the non-aqueous solvent include: cyclic carbonic acid esters such as ethylene carbonate, propylene carbonate, butylene carbonate and vinylene carbonate and derivatives thereof; non-cyclic carbonic acid esters such as dimethyl carbonate, diethyl carbonate and ethyl methyl carbonate and derivatives thereof; cyclic carboxylic acid esters such as γ-butyrolactone and γ-valerolactone and derivatives thereof; aliphatic carboxylic acid esters such as methyl formate, methyl acetate, methyl propionate and ethyl propionate and derivatives thereof; non-cyclic ethers such as dimethoxyethane, diethyl ether, 1,2-dimethoxyethane, 1,2-diethoxyethane, ethoxymethoxyethane and 1,3-dimethoxypropane and derivatives thereof; cyclic ethers such as tetrahydrofuran, 2-methyltetrahydrofuran and 1,3-dioxolane and derivatives thereof; other solvents such as dimethylsulfoxide, formamide, acetamide, dimethylformamide, dioxolane, acetonitrile, propylnitrile, nitromethane, ethyl monoglyme, phosphoric acid triesters, trimethoxymethane, dioxolane derivatives, sulfolane, methylsulfolane, 1,3-dimethyl-2-imidazolidinone, 3-methyl-2-oxazolidinone, ethyl ether, 1,3-propanesultone, anisole and N-methylpyrrolidone; and the like. They may be used singly or as a mixture of two or more of them.

Although the concentration of the solute in the non-aqueous electrolyte is not particularly limited, it is preferably 0.2 to 2 mol/liter, and more preferably 0.5 to 1.5 mol/liter.

Embodiment 2

In this embodiment, descriptions will be made on a non-aqueous electrolyte battery comprising the non-aqueous electrolyte of Embodiment 1. This battery comprises a positive electrode; a negative electrode; a separator interposed between the positive electrode and the negative electrode; and the above non-aqueous electrolyte.

(i) Negative Electrode

The negative electrode is fabricated, for example, by applying onto the surface of a current collector, a negative electrode mixture containing a negative electrode active material, a conductive agent, a binder and the like.

As the negative electrode active material, for example, lithium metal or a material capable of absorbing and desorbing lithium is used.

Examples of the material capable of absorbing and desorbing lithium include: thermally decomposed carbon; cokes such as pitch coke, needle coke and petroleum coke; graphites; glassy carbons; phenol resins, materials obtained by sintering and carbonizing furan resins or the like at an appropriate temperature; carbon materials such as carbon fibers and activated carbons; polymer materials such as polyacetylene, polypyrrole and polyacene; lithium-containing transition metal oxides such as Li$_{4/3}$Ti$_{5/3}$O$_4$; transition metal sulfides such as TiS$_2$; metals capable of forming an alloy with alkali metals such as Al, Pb, Sn, Bi and Si; cubic intermetallic compounds capable of intercalating alkali metals thereinto, such as AlSb, Mg$_2$Si and NiSi$_2$; and lithium-containing nitrides such as Li$_{3-x}$M$_x$N, where M is a transition metal. They may be used singly or as a mixture of two or more of them. Among them, carbon materials capable of absorbing and desorbing alkali metal ions are most commonly used.

Examples of the conductive agent in the negative electrode include: natural graphites such as flake graphite; artificial graphites; carbon blacks such as acetylene black, ketchen black, channel black, furnace black, lamp black and thermal black; conductive fibers such as carbon fibers and metal fibers; carbon fluoride; metal powders such as a copper powder and a nickel powder; organic conductive materials such as polyphenylene derivatives. They may be used singly or as a mixture of two or more of them. Among them, artificial graphites, acetylene black and carbon fibers are particularly preferred.

The amount of the conductive agent used in the negative electrode mixture is preferably 1 to 50 parts by weight, and more preferably 1 to 30 parts by weight per 100 parts by weight of the negative electrode active material. Here, it is not necessary to use the conductive agent when the negative electrode active material has an electronic conductivity.

Examples of the binder in the negative electrode include polyethylene, polypropylene, polytetrafluoroethylene, polyvinylidene fluoride, styrene butadiene rubber, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, ethylene-methacrylic acid copolymers, ethylene-methyl acrylate copolymers and ethylene-methyl methacrylate copolymers. They may be used singly or as a mixture of two or more of them. Among them, styrene butadiene rubber, polyvinylidene fluoride, ethylene-acrylic acid copolymers, ethylene-methacrylic acid copolymers, ethylene-methyl acrylate copolymers, ethylene-methyl methacrylate copolymers are particularly preferred.

As the current collector in the negative electrode, for example, one made of a stainless steel, nickel, copper, a copper alloy, titanium, carbon or a conductive polymer is used. Among them, a current collector made of copper or a copper alloy is particularly preferred. The surface of the current collector may be coated with carbon, nickel, titanium or the like, or it may also be oxidized. It is preferred to form asperities on the surface of the current collector. The current collector may be in the form of a foil, film, sheet, net, punched sheet, lath sheet, porous sheet, foamed sheet, nonwoven fabric or the like. Generally, the thickness of the current collector in the negative electrode is 1 to 500 µm.

(ii) Positive Electrode

The positive electrode is fabricated, for example, by applying onto the surface of a current collector, a positive electrode mixture containing a positive electrode active material, a conductive agent, a binder and the like.

Examples of the positive electrode active material include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, where M is at least one element selected from the group consisting of Na, Mg, Sc, Y, Mn, Fe, Co, Ni, Cu, Zn, Al, Cr, Pb, Sb and B, and x, y and z satisfy $0 \leq x \leq 1.2$, $0 \leq y \leq 0.9$, and $2.0 \leq z \leq 2.3$. The above value of x increases or decreases during the charging and discharging of the battery. Additionally, transition metal chalcogenides, lithium-containing vanadium oxides, lithium-containing niobium oxides, conductive conjugated polymers, Chevrel phase compounds or the like may also be used as the positive electrode active material. They may be used singly or as a mixture of two or more of them. The average particle size of the negative electrode active material is preferably 1 to 30 µm.

Examples of the conductive agent in the positive electrode include: natural graphites such as flake graphite; artificial graphites; carbon blacks such as acetylene black, ketchen black, channel black, furnace black, lamp black and thermal black; conductive fibers such as carbon fibers and metal fibers; carbon fluoride; metal powders such as a copper, nickel, aluminum or silver powder; conductive whiskers such as zinc oxide and potassium titanate; conductive metal oxides such as titanium oxide; organic conductive materials such as polyphenylene derivatives. They may be used singly or as a mixture of two or more of them. Among them, artificial graphites, acetylene black and a nickel powder are particularly preferred. The amount of the conductive agent used in the positive electrode mixture is preferably 1 to 50 parts by weight, more preferably 1 to 30 parts by weight, and in the case that a carbon black or a graphite is used, further preferably 2 to 15 parts by weight per 100 parts by weight of the positive electrode active material.

Examples of the binder in the positive electrode include polyethylene, polypropylene, polytetrafluoroethylene, polyvinylidene fluoride, tetrafluoroethylene-hexafluoroethylene copolymers, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, ethylene-methacrylic acid copolymers, ethylene-methyl acrylate copolymers and ethylene-methyl methacrylate copolymers. Among them, polyvinylidene fluoride and polytetrafluoroethylene are particularly preferred.

As the current collector in the positive electrode, for example, one made of a stainless steel, aluminum, an aluminum alloy, titanium, carbon or a conductive polymer may be used. Among them, a current collector made of aluminum or an aluminum alloy is preferred. The surface of current collector may be coated with carbon, titanium or the like, or it may also be oxidized. It is preferred to form asperities on the surface of the current collector. The current collector may be in the form of a foil, film, sheet, net, punched sheet, lath sheet, porous sheet, foamed sheet and nonwoven fabric. Generally, the thickness of the current collector in the positive electrode is 1 to 500 µm.

The positive electrode mixture or the negative electrode mixture may contain various additives, in addition to the above-described materials. They may also contain a gel comprising a polymer material retaining a non-aqueous electrolyte.

(iii) Separator

As the separator, an insulating microporous thin film having a high ionic permeability and a predetermined mechanical strength may be used. Additionally, it is preferred to give the separator the capability to increase the resistance by closing its pores in a high temperature range. In terms of the hydrophobic property and the resistance to an organic solvent, it is preferred to use a sheet, a nonwoven fabric or woven fabric made of an olefin type polymer such as polypropylene or polyethylene or a glass fiber. The pore size of the separator is preferably small enough to prevent the positive electrode material, negative electrode material, binder and conductive agent from passing therethrough, each of which is released from the electrode. The pore size may be, for example, 0.01 to 1 µm. Generally, the thickness of the separator is 10 to 300 µm and the porosity thereof is preferably 30 to 80%. Further, a battery can be configured by integrally molding a positive electrode and a negative electrode, with a porous separator made of a polymer material retaining a non-aqueous electrolyte interposed therebetween. As the polymer material, a copolymer of vinylidene fluoride and hexafluoropropylene is preferred.

The non-aqueous electrolyte battery of the present invention may be a coin, button, sheet, laminated, cylindrical, flat, or square type.

The non-aqueous electrolyte battery of the present invention is applicable to, for example, personal digital assistants, portable electronic appliances, domestic power storage devices, two-wheeled motor vehicles, electric vehicles, hybrid electric vehicles and the like.

Embodiment 3

In this embodiment, descriptions will be made on a preferred non-aqueous electrolyte for use in an electrolytic capacitor. A non-aqueous electrolyte of this embodiment can be obtained by dissolving the following solute in the following non-aqueous solvent.

(i) Solute

A non-aqueous electrolyte of this embodiment contains a solute represented by the general formula: $M''BR^1R^2R^3R^4$, wherein $M''$ is an ammonium group and $R^1$ to $R^4$ are electron withdrawing groups or electron withdrawing atoms bound to a boron atom where at least one of $R^1$ to $R^4$ is other than a fluorine atom.

It is preferred that at least one of $R^1$ to $R^4$ is a group represented by the general formula: $C_nF_{2n+1}$, where n is an integer of 1 to 4, or a group represented by the general formula: $C_mF_{2m+1}SO_2$, where m is an integer of 1 to 4. The remainders are preferably fluorine atoms.

The group represented by the general formula: $C_nF_{2n+1}$, where n is an integer of 1 to 4, and the group represented by the general formula: $C_mF_{2m+1}SO_2$, where m is an integer of 1 to 4 are the same as those in Embodiment 1. Therefore, a solute represented by the general formula: $M''B(C_nF_{2n+1})_2F_2$ and a solute represented by the general formula: $M''B(C_nF_{2n+1})_3F$ are more preferred from the viewpoint of, for example, ease of the synthesis of the solute.

It is preferred that the ammonium group $M''$ is represented by the general formula: $NR^5R^6R^7R^8$, where $R^5$ to $R^8$ are bound to N and are each independently halogen atoms, alkyl groups, alkenyl groups or aryl groups. Each of $R^5$ to $R^8$ is preferably an alkyl group, and more preferably an alkyl group having 1 to 4 carbon atoms. For example, an ammonium group represented by the general formula: $N(C_kH_{2k+1})_4$, where k is an integer of 1 to 4 is preferred.

Specific examples of the solute include $(CH_3)_4NB(CF_3)_4$, $(CH_3)_4NBF(CF_3)_3$, $(CH_3)_4NBF_2(CF_3)_2$, $(CH_3)_4NBF_3(CF_3)$, $(CH_3)_4NB(C_2F_5)_4$, $(CH_3)_4NBF(C_2F_5)_3$, $(CH_3)_4NBF_2(C_2F_5)_2$, $(CH_3)_4NBF_3(C_2F_5)$, $(C_2H_5)_4NB(CF_3)_4$, $(C_2H_5)_4NBF(CF_3)_3$, $(C_2H_5)_4NBF_2(CF_3)_2$, $(C_2H_5)_4NBF_3(CF_3)$, $(C_2H_5)_4NB(C_2F_5)_4$, $(C_2H_5)_4NBF(C_2F_5)_3$, $(C_2H_5)_4 NBF_2(C_2F_5)_2$, $(C_2H_5)_4NBF_3(C_2F_5)$, $((CH_{33}C)_4NB(CF_3)_4$, $((CH_3)_3C)_4NBF(CF_3)_3$, $((CH_3)_3C)_4 NBF_2(CF_3)_2$, $((CH_3)_3C)_4 NBF_3(CF_3)$, $((CH_3)_3C)_4NB(C_2F_5)_4$, $((CH_3)_3C)_4NBF(C_2F_5)_3$, $((CH_3)_3C)_4 NBF_2(C_2F_5)_2$, $((CH_3)_3C)_4NBF_3(C_2F_5)$, $(CH_3)_4NB(CF_3SO_2)_4$, $(CH_3)_4NBF(CF_3SO_2)_3$, $(CH_3)_4NBF_2(CF_3SO_2)_2$, $(CH_3)_4NBF_3(CF_3SO_2)$, $(CH_3)_4NB(C_2F_5SO_2)_4$, $(CH_3)_4NBF(C_2F_5SO_2)_3$, $(CH_3)_4NBF_2(C_2F_5SO_2)_2$, $(CH_3)_4NBF_3(C_2F_5SO_2)$, $(C_2H_5)_4NB(CF_3SO_2)_4$, $(C_2H_5)_4NBF(CF_3SO_2)_3$, $(C_2H_5)_4NBF_2(CF_3SO_2)_2$, $(C_2H_5)_4NBF_3(CF_3SO_2)$, $(C_2H_5)_4NB(C_2F_5SO_2)_4$, $(C_2H_5)_4NFB(C_2F_5SO_2)_3$, $(C_2H_5)_4NBF_2(C_2F_5SO_2)_2$, $(C_2H_5)_4NBF_3(C_2F_5SO_2)$, $((CH_3)_3C)_4NB(CF_3SO_2)_4$, $((CH_3)_3C)_4NBF(CF_3SO_2)_3$, $((CH_3)_3C)_4NBF_2(CF_3SO_2)_2$, $((CH_3)_3C)_4NBF_3(CF_3SO_2)$, $((CH_3)_3C)_4NB(C_2F_5SO_2)_4$, $((CH_3)_3C)_4NBF(C_2F_5SO_2)_3$, $((CH_3)_3C)_4NBF_2(C_2F_5SO_2)_2$, $((CH_3)_3C)_4NBF_3(C_2F_5SO_2)$ and the like. They may be used singly or as a mixture of two or more of them. The use of such solutes can provide an electrolytic capacitor which is operable over a wide temperature range and exhibits a small dielectric loss and an excellent charge/discharge characteristic.

The non-aqueous electrolyte may further contain $MClO_4$, $MBF_4$, $MPF_6$, $MAlCl_4$, $MSbF_6$, $MSCN$, $MCF_3SO_3$, $MCF_3CO_2$, $M(CF_3SO_2)_2$, $MAsF_6$, $MB_{10}Cl_{10}$, $MCl$, $MBr$, $MI$, where M is an ammonium group, quaternary ammonium salts of a lower aliphatic carboxylic acid, quaternary ammonium salts of chloroboran, imide salts such as bistetrafluoromethanesulfonic acid imide lithium $((CF_3SO_2)_2NLi)$, tetrafluoromethanesulfonic acid nonafluorobutanesulfonic acid imide lithium $(LiN(CF_3SO_2)(C_4F_9SO_2))$ and bispentafluoroethanesulfonic acid imide lithium $((C_2F_5SO_2)_2NLi)$.

(ii) Non-aqueous Solvent

Preferred examples of the non-aqueous solvent include polar protic organic solvents and polar aprotic organic solvents. They may be used singly or as a mixture of two or more of them.

Examples of the polar protic organic solvent include: monohydric alcohols such as ethanol, propanol, butanol, pentanol, hexanol, cyclobutanol, cyclopentanol and benzyl alcohol; polyhydric alcohols such as ethylene glycol, propylene glycol, glycerin, methyl cellosolve, ethyl cellosolve, methoxypropylene glycol and dimethoxypropanol; oxyalcohol compounds; and the like. They may be used singly or as a mixture of two or more of them.

Examples of the polar aprotic organic solvent include: amide compounds such as N-methylformamide, N,N-dimethylformamide, N-ethylformamide and N,N-diethylformamide; cyclic carboxylic acid esters such as γ-butyrolactone and γ-valerolactone; cyclic carbonic acid esters such as ethylene carbonate, propylene carbonate, butylene carbonate and vinylene carbonate; other solvents such as dimethylsulfoxide, 1,3-dioxolane, formamide, acetamide, dimethylformamide, dioxolane, acetonitrile, propylnitrile, nitromethane, ethyl monoglyme, phosphoric acid triesters, trimethoxymethane, dioxolane derivatives, sulfolane, methylsulfolane, 1,3-dimethyl-2-imidazolidinone, 3-methyl-2-oxazolidinone, ethyl ether, 1,3-propanesultone, anisole and N-methylpyrrolidone; and the like. They may be used singly or as a mixture of two or more of them.

Although the amount of the solute used is not particularly limited, it is preferably 0.1 to 40 parts by weight per 100 parts by weight of the non-aqueous solvent.

The voltage proof of the capacitor can be improved by adding boric acid, a complex compound of boric acid and a polysaccharide (e.g., mannitol or sorbitol), a complex compound of boric acid and a polyhydric alcohol (e.g., ethylene glycol or glycerin), a surfactant, colloidal silica or the like in the non-aqueous electrolyte.

Further, an aromatic nitro compound such as p-nitrobenzoic acid or p-nitrophenol; a phosphorous compound such as phosphoric acid, phosphorous acid, polyphosphoric acid or an acidic phosphoric acid ester compound; an oxycarboxylic acid compound or the like may be added to the electrolyte in order to reduce current leakage and to make a hydrogen gas absorbed thereby.

Embodiment 4

In this embodiment, descriptions will be made on an electrolytic capacitor comprising the non-aqueous electrolyte of Embodiment 3. The electrolytic capacitor comprises a positive electrode foil having a dielectric layer; a negative electrode foil; a separator interposed between the positive electrode foil and the negative electrode foil; and the above non-aqueous electrolyte.

The electrolytic capacitor comprises an element obtained by rolling up a positive electrode foil and a negative electrode foil with a separator interposed therebetween; a non-aqueous electrolyte with which the capacitor element is impregnated; and a case for accommodating them. The opening of the case is sealed with a sealing member.

As the positive electrode foil, for example, an aluminum foil is used. A dielectric layer can be formed on the positive electrode foil, for example, by etching the positive electrode foil to expand the surface area thereof in a boric acid and applying a positive potential of 300 to 600 V to the positive electrode foil versus the counter electrode. Through such a step, an oxide film used as the dielectric layer is formed on the positive electrode foil.

As the negative electrode foil, for example, an aluminum foil is used.

As the separator, for example, a nonwoven or woven fabric made of a kraft pulp fiber is used.

Hereinbelow, the present invention will be specifically described with reference to examples, but it should be understood that the invention is not construed as being limited thereto.

EXAMPLE 1

Each of solutes listed in Table 1 was dissolved at a concentration of 1.0 mol/liter in a mixed solvent containing ethylene carbonate and ethylmethyl carbonate at a volume ratio of 1:3 thereby to prepare each of electrolytes A to R. Table 1 shows the ionic conductivities at 20° C. of the respective electrolytes measured by using a bridge-type conductivity meter. Here, the ionic conductivities of electrolytes Q and R containing $LiBF_4$ and $LiPF_6$, respectively, at a concentration of 1.0 mol/liter, were also measured for comparison.

TABLE 1

| Electrolyte | Solute | Ionic conductivity (mS/cm) |
|---|---|---|
| A | $LiB(CF_3)_4$ | 7.52 |
| B | $LiBF(CF_3)_3$ | 5.11 |
| C | $LiBF_2(CF_3)_2$ | 4.02 |
| D | $LiBF_3(CF_3)$ | 3.21 |
| E | $LiB(C_2F_5)_4$ | 8.63 |
| F | $LiBF(C_2F_5)_3$ | 6.89 |
| G | $LiBF_2(C_2F_5)_2$ | 4.62 |
| H | $LiBF_3(C_2F_5)$ | 3.31 |
| I | $LiB(CF_3SO_2)_4$ | 8.55 |
| J | $LiBF(CF_3SO_2)_3$ | 7.62 |
| K | $LiBF_2(CF_3SO_2)_2$ | 5.83 |
| L | $LiBF_3(CF_3SO_2)$ | 4.47 |
| M | $LiB(C_2F_5SO_2)_4$ | 8.21 |
| N | $LiBF(C_2F_5SO_2)_3$ | 7.18 |
| O | $LiBF_2(C_2F_5SO_2)_2$ | 5.23 |
| P | $LiBF_3(C_2F_5SO_2)$ | 3.98 |
| Q | $LiBF_4$ | 2.91 |
| R | $LiPF_6$ | 8.52 |

From the results shown in Table 1, it can be seen that the use of a solute having one or more perfluoroalkyl group or perfluoroalkylsulfonic acid group gives a higher ionic conductivity to the non-aqueous electrolyte than the use of $LiBF_4$.

EXAMPLE 2

The potential window of each solute was measured by using the electrolytes A to R prepared in Example 1.

Test cells were assembled by using reference electrodes, counter electrodes, test electrodes and the electrolytes A to R. Here, a lithium foil was used for the reference electrode and the counter electrode, and a platinum plate having a surface area of 1 $cm^2$ was used for the test electrode.

Subsequently, the potential of each test electrode was scanned at 10 mV/sec to the oxidation direction. The potential of the test electrode versus the potential of the reference electrode when a current of 100 $\mu A/cm^2$ was passed was regarded as an oxidation decomposition potential. Meanwhile, the potential of each test electrode was scanned at 10 mV/sec to the reduction direction. The potential of the test electrode versus the potential of the reference electrode when a current of 100 $\mu A/cm^2$ was passed was regarded as a reduction decomposition potential. The results are shown in Table 2.

TABLE 2

| Electrolyte | Solute | Reduction decomposition potential (V) | Oxidation decomposition potential (V) |
|---|---|---|---|
| A | $LiB(CF_3)_4$ | <0.00 | 6.48 |
| B | $LiBF(CF_3)_3$ | <0.00 | 6.01 |
| C | $LiBF_2(CF_3)_2$ | <0.00 | 5.83 |
| D | $LiBF_3(CF_3)$ | <0.00 | 5.67 |
| E | $LiB(C_2F_5)_4$ | <0.00 | 6.32 |
| F | $LiBF(C_2F_5)_3$ | <0.00 | 6.11 |
| G | $LiBF_2(C_2F_5)_2$ | <0.00 | 5.94 |
| H | $LiBF_3(C_2F_5)$ | <0.00 | 5.71 |
| I | $LiB(CF_3SO_2)_4$ | <0.00 | 5.96 |
| J | $LiBF(CF_3SO_2)_3$ | <0.00 | 5.89 |
| K | $LiBF_2(CF_3SO_2)_2$ | <0.00 | 5.66 |
| L | $LiBF_3(CF_3SO_2)$ | <0.00 | 5.37 |
| M | $LiB(C_2F_5SO_2)_4$ | <0.00 | 6.10 |
| N | $LiBF(C_2F_5SO_2)_3$ | <0.00 | 5.98 |
| O | $LiBF_2(C_2F_5SO_2)_2$ | <0.00 | 5.73 |
| P | $LiBF_3(C_2F_5SO_2)$ | <0.00 | 5.49 |
| Q | $LiBF_4$ | <0.00 | 6.04 |
| R | $LiPF_6$ | <0.00 | 6.45 |

In Table 2, the potential window of each solute having one or more perfluoroalkyl group or perfluoroalkylsulfonic acid group is substantially equal to or wider than that of $LiBF_4$. This demonstrates that these solutes are suitable for a non-aqueous electrolyte battery such as a lithium battery.

EXAMPLE 3

Figure 1:
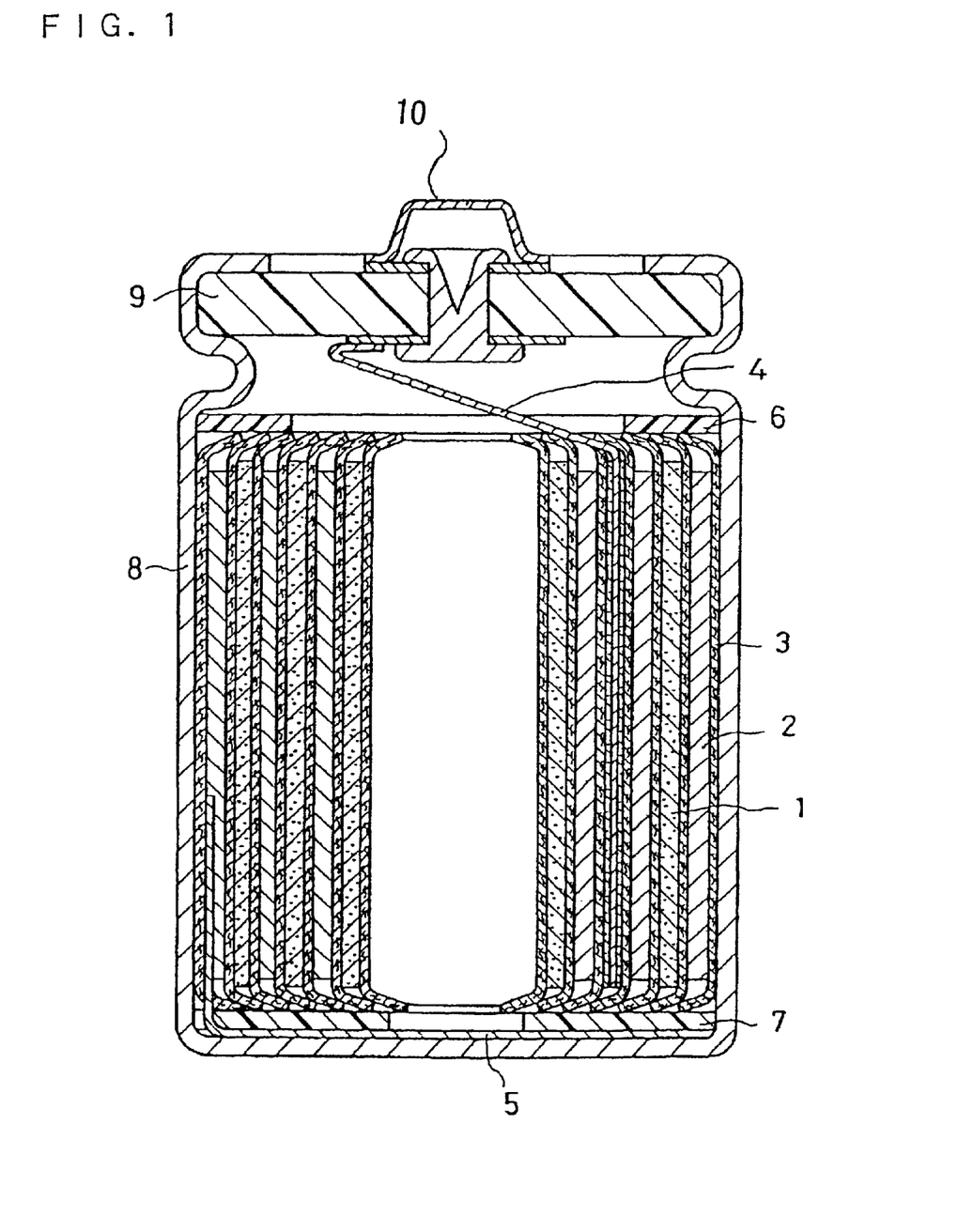
FIG. 1 is a vertical sectional view showing a cylindrical non-aqueous electrolyte battery of the present invention.

Cylindrical lithium batteries A to R were fabricated by using the electrolytes A to R prepared in Example 1, respectively. FIG. 1 shows a vertical sectional view of the battery thus produced.

A positive electrode slurry was applied onto a positive electrode current collector made of an aluminum foil, which was then dried and rolled thereby to produce a positive electrode plate 1. The positive electrode slurry was prepared by dispersing in dehydrated N-methylpyrrolidinone, a mixture of 85 parts by weight of a lithium cobaltate powder, 10 parts by weight of a carbon powder as a conductive agent and 5 parts by weight of polyvinylidene fluoride as a binder.

A negative electrode slurry was applied onto a negative electrode current collector made of a copper foil, which was then dried and rolled thereby to produce a negative electrode plate 2. The negative electrode slurry was prepared by dispersing in dehydrated N-methylpyrrolidinone, a mixture of 75 parts by weight of an artificial graphite powder, 20 parts by weight of a carbon powder as a conductive agent and 5 parts by weight of polyvinylidene fluoride as a binder.

The positive electrode plate 1 and the negative electrode plate 2 were rolled up together, with a separator 3 made of polyethylene interposed therebetween, thereby to obtain an electrode assembly. Insulating rings 6 and 7 were provided on the top and bottom portions of the electrode assembly, respectively. The electrode assembly thus obtained was accommodated in a battery case 8 made of a stainless steel. Then, a positive electrode lead 4 made of aluminum, which was attached to the positive electrode plate 1, was connected to a positive electrode terminal 10 disposed on a sealing plate 9. A negative electrode lead 5 made of nickel, which was attached to the negative electrode plate 2, was connected to the bottom of the battery case 8. After a predetermined electrolyte was injected into the battery case 8, the opening of the battery case 8 was sealed with the sealing plate 9 thereby to obtain a battery.

Each battery thus obtained was 18 mm in diameter and 65 mm in height with a nominal capacity of 1800 mAh. This battery was charged at a constant voltage of 4.2 V, and then discharged at a current of 360 mA or 3600 mA. The discharge capacities thus obtained are shown in Table 3.

After being discharged at a current of 360 mA, each battery was charged again at a constant voltage of 4.2 V. The charged battery was stored at 60° C. for one month, and was discharged at a current of 3600 mA thereafter. The discharge capacities thus obtained are also shown in Table 3.

TABLE 3

| Battery | Electrolyte | Discharge capacity at 360 mA (mAh) | Discharge capacity at 3600 mA (mAh) | Discharge capacity at 3600 mA after storage (mAh) |
|---|---|---|---|---|
| A | A | 1407 | 1052 | 875 |
| B | B | 1318 | 960 | 851 |
| C | C | 1297 | 920 | 805 |
| D | D | 1223 | 866 | 749 |
| E | E | 1638 | 1263 | 1127 |
| F | F | 1417 | 1002 | 888 |
| G | G | 1345 | 953 | 841 |
| H | H | 1240 | 885 | 766 |
| I | I | 1622 | 1238 | 1217 |
| J | J | 1582 | 1194 | 1041 |
| K | K | 1354 | 997 | 876 |
| L | L | 1305 | 927 | 812 |
| M | M | 1518 | 1179 | 1003 |
| N | N | 1429 | 1058 | 912 |
| O | O | 1332 | 978 | 857 |
| P | P | 1285 | 904 | 789 |
| Q | Q | 1105 | 843 | 432 |
| R | R | 1595 | 1210 | 1090 |

From the result shown in Table 3, it can be seen that the present invention provides a highly reliable lithium battery which exhibits excellent high-rate discharge characteristics as well as high temperature storage characteristics.

EXAMPLE 4

Non-aqueous electrolytes 1 to 27 were prepared by dissolving solutes listed in Table 4 at a concentration of 1.0 mol/liter in a mixed solvent containing ethylene carbonate and ethylmethyl carbonate at a volume ratio of 1:3. Table 4 shows the ionic conductivities of the respective electrolytes at 20° C. measured by using the bridge-type conductivity meter. Here, the ionic conductivities of electrolytes 25 to 27 containing $(CH_3)_4NBF_4$, $(C_2H_5)_4NBF_4$ and $((CH_3)_3C)_4NBF_4$, respectively, at a concentration of 1.0 mol/liter, were also measured for comparison.

TABLE 4

| Electrolyte | Solute | Ionic conductivity (mS/cm) |
|---|---|---|
| 1 | $(CH_3)_4NB(CF_3)_4$ | 7.22 |
| 2 | $(CH_3)_4NBF(CF_3)_3$ | 5.02 |
| 3 | $(CH_3)_4NBF_2(CF_3)_2$ | 3.98 |
| 4 | $(CH_3)_4NBF_3(CF_3)$ | 3.09 |
| 5 | $(CH_3)_4NB(C_2F_5)_4$ | 8.31 |
| 6 | $(CH_3)_4NBF(C_2F_5)_3$ | 6.72 |
| 7 | $(CH_3)_4NBF_2(C_2F_5)_2$ | 4.43 |
| 8 | $(CH_3)_4NBF_3(C_2F_5)$ | 3.27 |
| 9 | $(C_2H_5)_4NB(CF_3)_4$ | 6.88 |
| 10 | $(C_2H_5)_4NBF(CF_3)_3$ | 4.71 |
| 11 | $(C_2H_5)_4NBF_2(CF_3)_2$ | 3.60 |
| 12 | $(C_2H_5)_4NBF_3(CF_3)$ | 2.98 |
| 13 | $(C_2H_5)_4NB(C_2F_5)_4$ | 7.19 |
| 14 | $(C_2H_5)_4NBF(C_2F_5)_3$ | 4.97 |
| 15 | $(C_2H_5)_4NBF_2(C_2F_5)_2$ | 3.89 |
| 16 | $(C_2H_5)_4NBF_3(C_2F_5)$ | 3.01 |
| 17 | $((CH_3)_3C)_4NB(CF_3)_4$ | 6.19 |
| 18 | $((CH_3)_3C)_4NBF(CF_3)_3$ | 4.45 |
| 19 | $((CH_3)_3C)_4NBF_2(CF_3)_2$ | 3.32 |
| 20 | $((CH_3)_3C)_4NBF_3(CF_3)$ | 2.69 |
| 21 | $((CH_3)_3C)_4NB(C_2F_5)_4$ | 6.74 |
| 22 | $((CH_3)_3C)_4NBF(C_2F_5)_3$ | 4.38 |
| 23 | $((CH_3)_3C)_4NBF_2(C_2F_5)_2$ | 3.26 |
| 24 | $((CH_3)_3C)_4NBF_3(C_2F_5)$ | 2.72 |
| 25 | $(CH_3)_4NBF_4$ | 2.79 |
| 26 | $(C_2H_5)_4NBF_4$ | 2.36 |
| 27 | $((CH_3)_3C)_4NBF_4$ | 2.05 |

From the results shown in Table 4, it can be seen that the use of each solute having one or more perfluoroalkyl group gives a higher ionic conductivity to the non-aqueous electrolyte than the use of the solute whose anion portion is $BF_4$.

EXAMPLE 5

The potential window of each solute was measured in the same manner as in Example 2, except for using the non-aqueous electrolytes 1 to 27 prepared in Example 4. The results are shown in Table 5.

TABLE 5

| Electrolyte | Solute | Reduction decomposition potential (V) | Oxidation decomposition potential (V) |
|---|---|---|---|
| 1 | $(CH_3)_4NB(CF_3)_4$ | <0.00 | 6.47 |
| 2 | $(CH_3)_4NBF(CF_3)_3$ | <0.00 | 6.16 |
| 3 | $(CH_3)_4NBF_2(CF_3)_2$ | <0.00 | 6.04 |
| 4 | $(CH_3)_4NBF_3(CF_3)$ | <0.00 | 5.95 |
| 5 | $(CH_3)_4NB(C_2F_5)_4$ | <0.00 | 6.34 |
| 6 | $(CH_3)_4NBF(C_2F_5)_3$ | <0.00 | 6.25 |
| 7 | $(CH_3)_4NBF_2(C_2F_5)_2$ | <0.00 | 6.11 |
| 8 | $(CH_3)_4NBF_3(C_2F_5)$ | <0.00 | 5.99 |
| 9 | $(C_2H_5)_4NB(CF_3)_4$ | <0.00 | 6.26 |
| 10 | $(C_2H_5)_4NBF(CF_3)_3$ | <0.00 | 6.08 |
| 11 | $(C_2H_5)_4NBF_2(CF_3)_2$ | <0.00 | 5.94 |
| 12 | $(C_2H_5)_4NBF_3(CF_3)$ | <0.00 | 5.85 |
| 13 | $(C_2H_5)_4NB(C_2F_5)_4$ | <0.00 | 6.18 |
| 14 | $(C_2H_5)_4NBF(C_2F_5)_3$ | <0.00 | 6.13 |
| 15 | $(C_2H_5)_4NBF_2(C_2F_5)_2$ | <0.00 | 5.99 |
| 16 | $(C_2H_5)_4NBF_3(C_2F_5)$ | <0.00 | 5.90 |
| 17 | $((CH_3)_3C)_4NB(CF_3)_4$ | <0.00 | 6.20 |
| 18 | $((CH_3)_3C)_4NBF(CF_3)_3$ | <0.00 | 5.99 |
| 19 | $((CH_3)_3C)_4NBF_2(CF_3)_2$ | <0.00 | 5.86 |
| 20 | $((CH_3)_3C)_4NBF_3(CF_3)$ | <0.00 | 5.77 |
| 21 | $((CH_3)_3C)_4NB(C_2F_5)_4$ | <0.00 | 6.11 |
| 22 | $((CH_3)_3C)_4NBF(C_2F_5)_3$ | <0.00 | 6.05 |
| 23 | $((CH_3)_3C)_4NBF_2(C_2F_5)_2$ | <0.00 | 5.92 |
| 24 | $((CH_3)_3C)_4NBF_3(C_2F_5)$ | <0.00 | 5.81 |
| 25 | $(CH_3)_4NBF_4$ | <0.00 | 6.02 |
| 26 | $(C_2H_5)_4NBF_4$ | <0.00 | 5.93 |
| 27 | $((CH_3)_3C)_4NBF_4$ | <0.00 | 5.82 |

In Table 5, the potential window of each solute having one or more perfluoroalkyl group is substantially equal to or wider than that of each solute whose anion portion is $BF_4$. This demonstrates that these solutes are suitable for electrolytic capacitors.

EXAMPLE 6

Electrolytic capacitors comprising the electrolytes 1 to 27 prepared in Example 4 were produced in the following manner.

The surface of an aluminum foil having a thickness of 100 μm was etched by electrolysis. A positive potential of 500 V versus the potential of the counter electrode was applied on the etched aluminum foil in a boric acid, which was then stood still for 15 minutes. As a result, an aluminum oxide film used as a dielectric layer was formed on the surface of the aluminum foil.

Subsequently, an aluminum foil having an aluminum oxide film used as a positive electrode foil and another aluminum foil used as a negative electrode foil were rolled up together, with a separator made of a kraft pulp fiber interposed therebetween, thereby to obtain a capacitor element. The capacitor element thus obtained was impregnated with a predetermined non-aqueous electrolyte. The capacitor element impregnated with the non-aqueous electrolyte was accommodated in a case made of aluminum. Then, the opening of the case was sealed with an insulating sealing member, and the leads of the positive electrode foil and the negative electrode foil were threaded through the sealing member to be pulled outside, thereby obtaining an electrolytic capacitor.

Subsequently, the electrolytic capacitor thus obtained was evaluated for the frequency characteristics.

Figure 2:
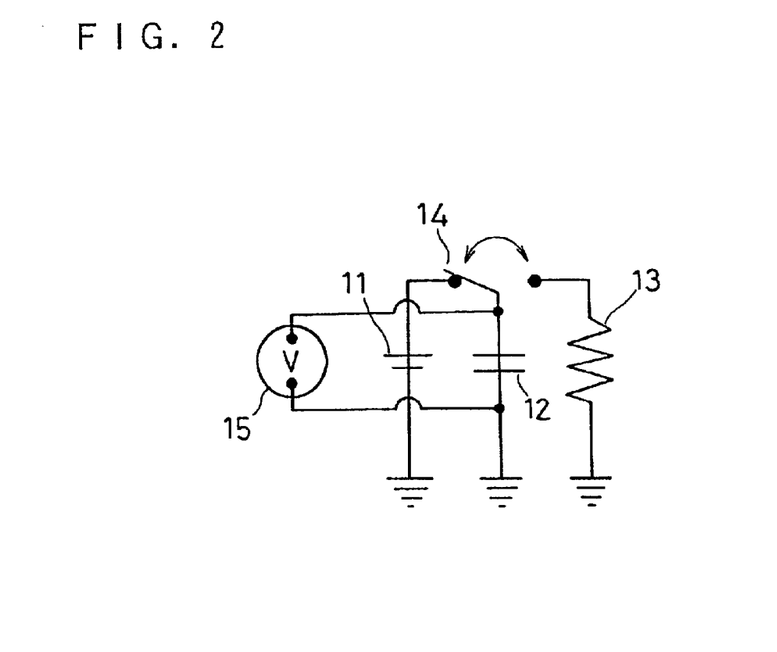
FIG. 2 is a diagram showing a circuit of a device used for evaluating the frequency characteristics of an electrolytic capacitor.
Figure 3:
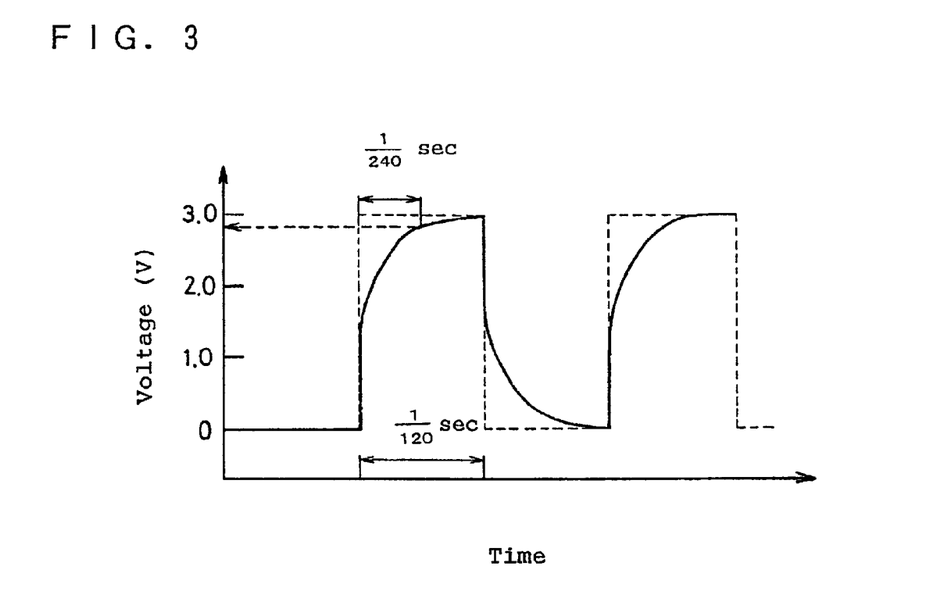
FIG. 3 is a graph showing the change in the potential difference between the both electrode foils of an electrolytic capacitor of the present invention on which a pulse voltage is applied.

A circuit as shown in FIG. 2 was assembled, which comprised a direct-current power source 11, an electrolytic capacitor 12, a resistor 13, a relay switch 14 and a voltmeter 15. The negative side of the direct-current power source, the negative electrode foil side of the electrolytic capacitor and the resistor were grounded. Then, the relay switch was activated at a duty ratio of 0.5 (50%) and at a frequency of 60 Hz to apply a pulse voltage on the electrolytic capacitor. Here, the upper limit of the applied voltage was set at 3.0 V. FIG. 3 shows the change in the difference between the potentials of the negative electrode foil and the positive electrode foil of the electrolytic capacitor.

The voltage value of the electrolytic capacitor was recorded 1/240 second after the start of the charging during each charging interval, and this measurement was conducted for 10 seconds. The average values of the recorded voltages are shown in Table 6. It can be said that the charge/discharge characteristics improve with an increase in the speed of the potential rise on the positive electrode foil.

TABLE 6

| Capacitor | Electrolyte | Solute | Voltage (V) |
|---|---|---|---|
| 1 | 1 | $(CH_3)_4NB(CF_3)_4$ | 2.94 |
| 2 | 2 | $(CH_3)_4NBF(CF_3)_3$ | 2.80 |
| 3 | 3 | $(CH_3)_4NBF_2(CF_3)_2$ | 2.59 |
| 4 | 4 | $(CH_3)_4NBF_3(CF_3)$ | 2.28 |
| 5 | 5 | $(CH_3)_4NB(C_2F_5)_4$ | 2.96 |
| 6 | 6 | $(CH_3)_4NBF(C_2F_5)_3$ | 2.89 |
| 7 | 7 | $(CH_3)_4NBF_2(C_2F_5)_2$ | 2.66 |
| 8 | 8 | $(CH_3)_4NBF_3(C_2F_5)$ | 2.35 |
| 9 | 9 | $(C_2H_5)_4NB(CF_3)_4$ | 2.51 |
| 10 | 10 | $(C_2H_5)_4NBF(CF_3)_3$ | 2.74 |
| 11 | 11 | $(C_2H_5)_4NBF_2(CF_3)_2$ | 2.44 |
| 12 | 12 | $(C_2H_5)_4NBF_3(CF_3)$ | 2.20 |
| 13 | 13 | $(C_2H_5)_4NB(C_2F_5)_4$ | 2.93 |
| 14 | 14 | $(C_2H_5)_4NBF(C_2F_5)_3$ | 2.78 |
| 15 | 15 | $(C_2H_5)_4NBF_2(C_2F_5)_2$ | 2.53 |
| 16 | 16 | $(C_2H_5)_4NBF_3(C_2F_5)$ | 2.22 |
| 17 | 17 | $((CH_3)_3C)_4NB(CF_3)_4$ | 2.88 |
| 18 | 18 | $((CH_3)_3C)_4NBF(CF_3)_3$ | 2.69 |
| 19 | 19 | $((CH_3)_3C)_4NBF_2(CF_3)_2$ | 2.39 |
| 20 | 20 | $((CH_3)_3C)_4NBF_3(CF_3)$ | 2.15 |
| 21 | 21 | $((CH_3)_3C)_4NB(C_2F_5)_4$ | 2.90 |
| 22 | 22 | $((CH_3)_3C)_4NBF(C_2F_5)_3$ | 2.63 |

TABLE 6-continued

| Capacitor | Electrolyte | Solute | Voltage (V) |
|---|---|---|---|
| 23 | 23 | $((CH_3)_3C)_4NBF_2(C_2F_5)_2$ | 2.33 |
| 24 | 24 | $((CH_3)_3C)_4NBF_3(C_2F_5)$ | 2.16 |
| 25 | 25 | $(CH_3)_4NBF_4$ | 2.18 |
| 26 | 26 | $(C_2H_5)_4NBF_4$ | 2.11 |
| 27 | 27 | $((CH_3)_3C)_4NBF_4$ | 2.02 |

From the results shown in Table 6, it can be seen that the electrolytic capacitor using each solute having one or more perfluoroalkyl group exhibits superior frequency characteristics. This is presumably due to the increase in the ionic conductivity of the non-aqueous electrolyte.

When a similar measurement was conducted at an increased charge voltage, the electrolytic capacitor using each solute having one or more perfluoroalkyl group showed little deterioration in the charge/discharge characteristics. The deterioration of the charge/discharge characteristics was presumably due to the decomposition of an anion by oxidation.

From the results, it can be seen that the use of each solute having one or more perfluoroalkyl group can improve the stability of an electrolytic capacitor.

As described above, the present invention uses a solute which has a thermal stability substantially equal to that of $LiBF_4$ and an anion portion having a high electronegativity, and easily dissociates into ions. Therefore, it provides a non-aqueous electrolyte having a high thermal stability as well as a high ionic conductivity. Furthermore, the use of the non-aqueous electrolyte of the present invention can provide a non-aqueous electrochemical device having an excellent high-rate charge/discharge characteristic.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte, comprising a non-aqueous solvent and a solute represented by the general formula (1):

$MBR^1R^2R^3R^4$ wherein M is an alkali metal atom or an ammonium group and $R^1$ to $R^4$ are each independently selected from the group consisting of a perfluoroalkyl group, a perfluoroalkylsulfonic acid group, and a fluorine atom bound to B where at least one of $R^1$ to $R^4$ is other than a fluorine atom.

2. The non-aqueous electrolyte in accordance with claim 1, wherein at least one of $R^1$ to $R^4$ is represented by the general formula (2): $C_nF_{2n+1}$, where n is an integer of 1 to 4, or the general formula (3): $C_mF_{2m+1}SO_2$, where m is an integer of 1 to 4.

3. The non-aqueous electrolyte in accordance with claim 1, wherein said solute is at least one selected from the group consisting of $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(CF_3SO_2)_4$, $LiBF(CF_3SO_2)_3$, $LiBF_2(CF_3SO_2)_2$, $LiBF_3(CF_3SO_2)$, $LiB(C_2F_5SO_2)_4$, $LiBF(C_2F_5SO_2)_3$, $LiBF_2(C_2F_5SO_2)_2$ and $LiBF_3(C_2F_5SO_2)$.

4. The non-aqueous electrolyte in accordance with claim 1, wherein said ammonium group is represented by the general formula (4): $NR^5R^6R^7R^8$, where $R^5$ to $R^8$ are bound to N and are each independently hydrogen atoms, alkyl groups, alkenyl groups or aryl groups.

5. The non-aqueous electrolyte in accordance with claim 1, wherein said solute is at least one selected from the group consisting of $(CH_3)_4NB(CF_3)_4$, $(CH_3)_4NBF(CF_3)_3$, $(CH_3)_4NBF_2(CF_3)_2$, $(CH_3)_4NBF_3(CF_3)$, $(CH_3)_4NB(C_2F_5)_4$, $(CH_3)_4NBF(C_2F_5)_3$, $(CH_3)_4NBF_2(C_2F_5)_2$, $(CH_3)_4NBF_3(C_2F_5)$, $(C_2H_5)_4NB(CF_3)_4$, $(C_2H_5)_4NBF(CF_3)_3$, $(C_2H_5)_4NBF_2(CF_3)_2$, $(C_2H_5)_4NBF_3(CF_3)$, $(C_2H_5)_4NB(C_2F_5)_4$, $(C_2H_5)_4NBF(C_2F_5)_3$, $(C_2H_5)_4NBF_2(C_2F_5)_2$, $(C_2H_5)_4NBF_3(C_2F_5)$, $((CH_3)_3C)_4NB(CF_3)_4$, $((CH_3)_3C)_4NBF(CF_3)_3$, $((CH_3)_3C)_4NBF_2(CF_3)_2$, $((CH_3)_3C)_4NBF_3(CF_3)$, $((CH_3)_3C)_4NB(C_2F_5)_4$, $((CH_3)_3C)_4NBF(C_2F_5)_3$, $((CH_3)_3C)_4NBF_2(C_2F_5)_2$, $((CH_3)_3C)_4NBF_3(C_2F_5)$, $(CH_3)_4NB(CF_3SO_2)_4$, $(CH_3)_4NBF(CF_3SO_2)_3$, $(CH_3)_4NBF_2(CF_3SO_2)_2$, $(CH_3)_4NBF_3(CF_3, SO_2)$, $(CH_3)_4NB(C_2F_5SO_2)_4$, $(CH_3)_4NBF(C_2F_5SO_2)_3$, $(CH_3)_4NBF_2(C_2F_5SO_2)_2$, $(CH_3)_4NBF_3(C_2F_5SO_2)$, $(C_2H_5)_4NB(CF_3SO_2)_4$, $(C_2H_5)_4NBF(CF_3SO_2)_3$, $(C_2H_5)_4NBF_2(CF_3SO_2)_2$, $(C_2H_5)_4NBF_3(CF_3SO_2)$, $(C_2H_5)_4NB(C_2F_5SO_2)_4$, $(C_2H_5)_4NBF(C_2F_5SO_2)_3$, $(C_2H_5)_4NBF_2(C_2F_5SO_2)_2$, $(C_2H_5)_4NBF_3(C_2F_5SO_2)$, $((CH_3)_3C)_4NB(CF_3SO_2)_4$, $((CH_3)_3C)_4NBF(CF_3SO_2)_3$, $((CH_3)_3C)_4NBF_2(CF_3SO_2)_2$, $((CH_3)_3C)_4NBF_3(CF_3SO_2)$, $((CH_3)_3C)_4NB(C_2F_5SO_2)_4$, $((CH_3)_3C)_4NBF(C_2F_5SO_2)_3$, $((CH_3)_3C)_4NBF_2(C_2F_5SO_2)_2$ and $((CH_3)_3C)_4NBF_3(C_2F_5SO_2)$.

6. An electrochemical device, comprising the non-aqueous electrolyte in accordance with claim 1.

7. A non-aqueous electrolyte battery, comprising a positive electrode; a negative electrode; a separator interposed between said positive electrode and said negative electrode; and the non-aqueous electrolyte in accordance with claim 3.

8. An electrolytic capacitor, comprising a positive electrode foil having a dielectric layer; a negative electrode foil; a separator interposed between said positive electrode foil and said negative electrode foil; and the non-aqueous electrolyte in accordance with claim 5.

9. An electric double layer capacitor, comprising a pair of polarizable electrodes made of activated carbon; a separator interposed between said electrodes; and the non-aqueous electrolyte in accordance with claim 5.

* * * * *